(12) United States Patent
Christensen (10) Patent No.: US 7,347,051 B2
(45) Date of Patent: Mar. 25, 2008

(54) PROCESSING OF RESIDUAL OIL BY RESIDUAL OIL SUPERCRITICAL EXTRACTION INTEGRATED WITH GASIFICATION COMBINED CYCLE

(75) Inventor: Keld Georg Christensen, The Woodlands, TX (US)

(73) Assignee: Kellogg Brown & Root LLC, Houston, TX (US)

( * ) Notice: Subject to any disclaimer, the term of this patent is extended or adjusted under 35 U.S.C. 154(b) by 624 days.

(21) Appl. No.: 10/708,290

(22) Filed: Feb. 23, 2004

(65) Prior Publication Data
US 2005/0183989 A1   Aug. 25, 2005

(51) Int. Cl.
*F02C 6/18* (2006.01)

(52) U.S. Cl. .................. 60/780; 208/309

(58) Field of Classification Search .......... 60/772, 60/780; 208/309
See application file for complete search history.

(56) References Cited

U.S. PATENT DOCUMENTS

| | | | |
|---|---|---|---|
| 4,125,458 A | 11/1978 | Bushnell | 208/309 |
| 4,354,928 A | 10/1982 | Audeh et al. | 208/309 |
| 4,528,100 A * | 7/1985 | Zarchy | 210/634 |
| 4,536,283 A | 8/1985 | Davis | 208/309 |
| 4,784,753 A * | 11/1988 | Hotier et al. | 208/309 |
| 5,000,838 A | 3/1991 | Bartilucci et al. | 208/86 |
| 5,192,421 A | 3/1993 | Audeh et al. | 208/309 |
| 5,242,578 A | 9/1993 | Taylor et al. | 208/309 |
| 5,466,365 A | 11/1995 | Savastano et al. | 208/309 |
| 5,843,302 A * | 12/1998 | Hood | 208/309 |
| 5,911,875 A * | 6/1999 | Hervish et al. | 208/309 |
| 5,944,984 A * | 8/1999 | Benguigui et al. | 208/309 |
| 5,976,361 A | 11/1999 | Hood et al. | 208/309 |
| 6,241,874 B1 | 6/2001 | Wallace et al. | 208/45 |
| 6,274,032 B2 * | 8/2001 | Hood et al. | 208/309 |
| 6,357,526 B1 * | 3/2002 | Abdel-Halim et al. | 166/272.3 |
| 6,786,050 B1 * | 9/2004 | Okada et al. | 60/780 |

* cited by examiner

Primary Examiner—William H. Rodriguez
(74) Attorney, Agent, or Firm—KBR IP Legal (57) ABSTRACT

Residual oil supercritical extraction (ROSE) 10 and integrated gasification combined-cycle (IGCC) power systems 70, 114 are cooperatively integrated. High-level heat from the IGCC is used via a heat transfer fluid 84 for high level process heating requirements in the ROSE unit. This can eliminate the fired heater normally required in the ROSE unit, and reduces the size of the gasifier 62 waste heat boiler 72 and/or the high-pressure steam coil 134 and steam turbine generator 144 in the IGCC.

19 Claims, 11 Drawing Sheets

PROCESSING OF RESIDUAL OIL BY RESIDUAL OIL SUPERCRITICAL EXTRACTION INTEGRATED WITH GASIFICATION COMBINED CYCLE

BACKGROUND OF INVENTION

This invention relates to integrated processing of residual oil by residual oil supercritical extraction (ROSE), asphaltene gasification, gas cleaning, and generation of power, steam, hydrogen and/or synthesis gas, and more particularly to ROSE integration with gasification and combined cycle power and/or steam generation using high-level heat exchange to eliminate the need for a fired heater and/or steam generator supporting the ROSE unit.

The process of gasification, gas cleaning, and combined-cycle power generation is known as integrated gasification combined cycle or IGCC. IGCC disposes of residual oil, asphaltenes, or other fuels with impurities to produce power, and can also provide steam, synthesis gas and/or hydrogen. Heat may be recovered from the gasifier effluent in a high pressure boiler, and after treatment to remove soot, metals, acid gases, and other impurities as needed, the gasifier effluent is used as fuel gas in a combustion turbine to generate electrical power. Additional heat is recovered from the hot turbine exhaust in another high pressure boiler (known as a heat recovery steam generator or HRSG), and high pressure steam from both the gasifier and turbine exhaust boilers may be fed to steam turbines to generate additional electricity. Alternatively, all or part of the cleaned gasifier effluent can be used locally or exported as fuel gas or synthesis gas, or used to produce hydrogen, e.g. by shift conversion.

ROSE is typically used to recover deasphalted oil (DAO) from a residual oil (resid) for further treatment, typically catalytic cracking, leaving an asphaltene stream having minimal value. ROSE consumes large quantities of process heat, with significant high-level heat loads at temperatures ranging as high as 260° C. to 425° C., depending on the solvent and operating conditions. A dedicated fired heater typically provides the heat loads. The fired heater is expensive, requires operator attention, requires costly fuel, takes up valuable area in an industrial complex, and constitutes a source of air pollution.

U.S. Pat. No. 6,241,874 to Wallace et al integrates solvent deasphalting with gasification of asphaltenes to syngas using low-level heat from the gasification to recover solvent in the deasphalting unit. Sensible heat is recovered from the synthesis gas to provide the low level heat for separating and recovering solvent from the DAO-solvent mixture in the deasphalting unit. The synthesis gas is supplied directly to a heat exchanger for one separation column in the deasphalting unit, and low pressure steam is supplied to another separation column.

Other U.S. patents of interest to the present invention include: U.S. Pat. Nos. 5,976,361 and 6,274,032 to Hood et al; U.S. Pat. No. 5,911,875 to Hervish et al; U.S. Pat. No. 5,466,365 to Savastano et al; U.S. Pat. No. 5,242,578 to Taylor et al; U.S. Pat. No. 5,192,421 to Audeh et al; U.S. Pat. No. 5,000,838 to Bartilucci et al; U.S. Pat. No. 4,536,283 to Davis; U.S. Pat. No. 4,354,928 to Audeh et al; and U.S. Pat. No. 4,125,458 to Bushnell. All patents and publications mentioned herein are hereby incorporated by reference in their entirety.

SUMMARY OF INVENTION

The present invention can integrate residual oil supercritical extraction (ROSE) with gasification of the asphaltenes, gas cleaning and combined-cycle power generation or co-generation (IGCC). The ROSE-IGCC integration can use high-level heat from the IGCC to provide the high-level heat requirements of the ROSE unit.

The ROSE-IGCC integration of the present invention can: (1) maximize DAO recovery for catalytic cracking or other uses; (2) reduce or eliminate the export or disposal of refinery bottoms; (3) reduce the size and cost of IGCC gasifier, boilers, turbines and generators; (4) further reduce capital costs by eliminating the fired heater from the ROSE unit; (5) provide hot oil or steam at high-level temperatures for the ROSE unit; (6) produce fuel gas, synthesis gas and/or hydrogen; and (7) produce electrical power and/or steam.

In one embodiment, the present invention broadly provides an integrated process for ROSE, asphaltenes gasification, gas cleaning and combined cycle power generation or gas processing. The process includes processing the residual oil with solvent in a ROSE unit having high level heat requirements to recover an asphaltene stream and a deasphalted oil stream, gasifying the asphaltene stream to form a gas stream, and cleaning the gas stream to remove ash, soot, sulfur or a combination thereof. The cleaned gas stream is supplied to (1) a combined cycle system for generation of power, steam or a combination thereof, (2) a gas processing system to produce hydrogen, synthesis gas, fuel gas, or a combination thereof, or (3) a combination thereof. High level heat is recovered from the gas stream from the gasification, from the combined cycle system, or from a combination thereof, to supply the high level heat requirements of the ROSE unit.

The high level heat recovery and ROSE requirements are desirably at temperatures of at least 155° C. The high-level heat recovery and ROSE requirements desirably use, wholly or partially, (1) steam at a pressure of at least 0.7 MPa, (2) a heat transfer fluid at a pressure below 1 MPa, or (3) a combination thereof. The process is especially advantageous where a majority of the ROSE solvent is pentane.

In one desirable embodiment, high level heat is recovered from the gas stream from the gasification using a high-pressure steam boiler and a heat transfer fluid heater, and the heat transfer fluid from the heater is supplied to provide the high level heat requirements of the ROSE unit, desirably substantially all of the requirements, and recirculated to the heater.

In another desirable embodiment, high level heat is recovered from the gas stream from the gasification using a first high-pressure steam boiler and a heat transfer fluid heater. High level heat is recovered from gas turbine exhaust in the combined-cycle system using a second high-pressure steam boiler. The heat transfer fluid from the heater is supplied to provide from 30 to 70 percent of the high level heat requirements of the ROSE unit and recirculated to the heater, and steam from the first boiler, the second boiler, or a combination thereof is supplied to provide from 30 to 70 percent of the high level heat requirements of the ROSE unit.

In another desirable embodiment, high level heat is recovered from the combined-cycle system using a heat transfer fluid heater, and the heat transfer fluid from the heater is supplied to provide the high level heat requirements of the ROSE unit, desirably substantially all of the requirements, and recirculated to the heater.

In an alternate embodiment, high level heat is recovered from the gas stream from the gasification using a first high-pressure steam boiler, and from gas turbine exhaust in the combined cycle system using a second high-pressure steam boiler and a heat transfer fluid heater. The heat transfer fluid from the heater is supplied to provide from 30 to 70 percent of the high level heat requirements of the ROSE unit and recirculated to the heater, and steam from the first boiler, the second boiler, or a combination thereof is supplied to satisfy from 30 to 70 percent of the high level heat input to the solvent extraction.

In another alternate embodiment, heat is recovered from gas turbine exhaust in the combined-cycle system using a high-pressure steam boiler, and from the gas stream from the gasification using a medium-pressure steam boiler. Steam from the high-pressure boiler is supplied to provide the high level heat requirements of the ROSE unit. Steam from the medium-pressure boiler can be supplied to provide the low level heat requirements of the ROSE unit.

In a further embodiment, low-pressure steam from the ROSE unit is supplied to heat boiler feed water for the high level heat recovery, to heat fluid in a reboiler for the fuel gas cleaning, or a combination thereof.

DETAILED DESCRIPTION

Figure 1:
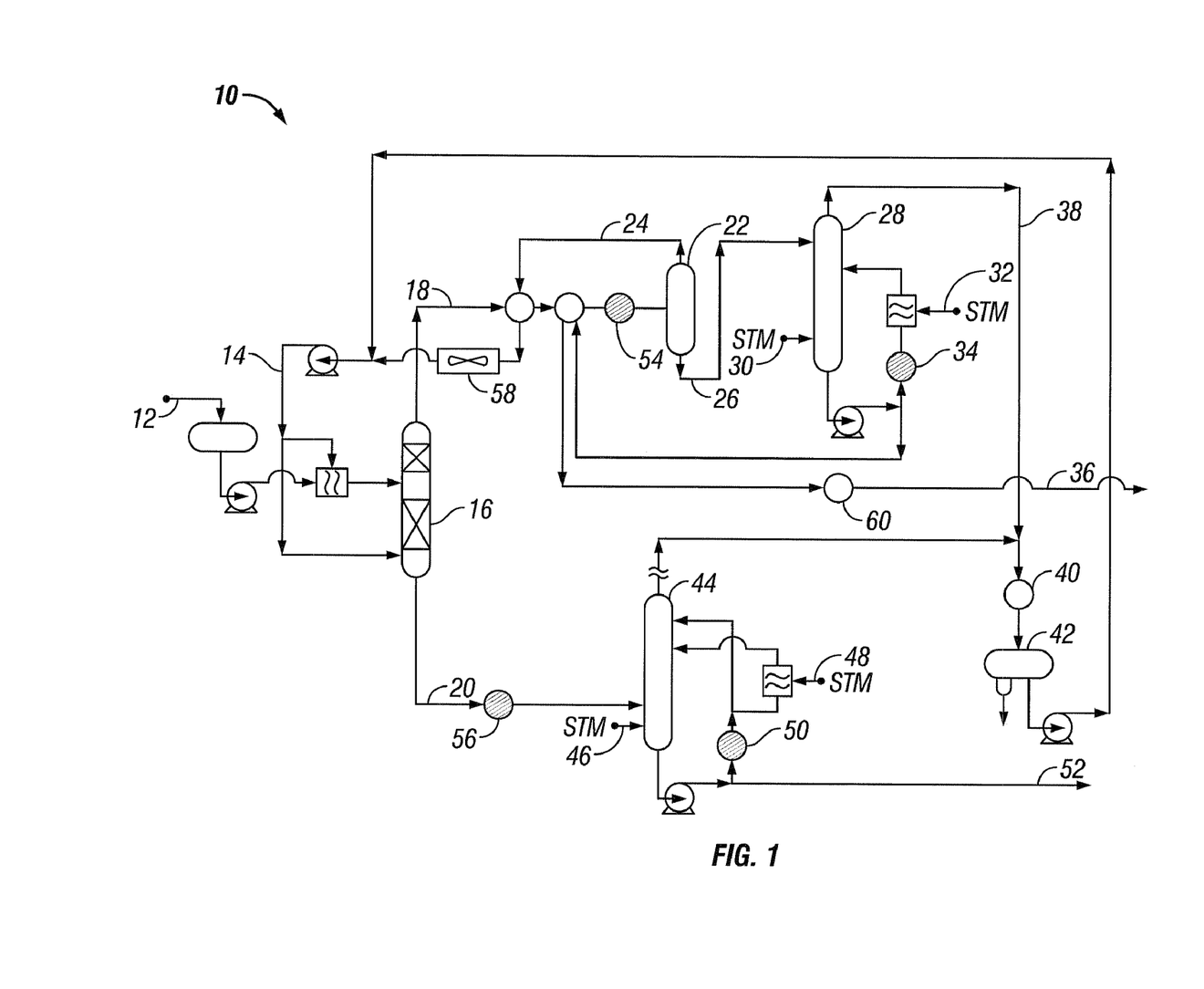
FIG. 1 is a process schematic of a residual oil supercritical extraction (ROSE) unit for integration with an integrated gasification and combined-cycle (IGCC) system according to an embodiment of the present invention.

In the figures wherein like numbers identify elements of like meaning and function, FIG. 1 is a process schematic of a typical residual oil supercritical extraction (ROSE) unit 10 that can be integrated with an IGCC system (see FIG. 2) according to the present invention. The ROSE unit 10 (without IGCC heat integration) is well known in the art. Briefly, residual oil such as atmospheric tower bottoms (ATB) or vacuum tower bottoms (VTB) in stream 12 is fed with solvent from stream 14 to solvent extraction unit 16 to obtain a deasphalted oil (DAO) rich stream 18 and an asphaltenes-rich stream 20. The DAO-solvent stream 18 is fed to separator 22, which is operated in the supercritical retrograde condensation regime to produce overhead recycle solvent stream 24 and DAO-rich bottoms stream 26. Bottoms stream 26 is heated and fed to DAO stripper 28 with steam introduced via streams 30 and 32 and additional heating via reboiler 34 to obtain DAO product stream 36 essentially free of solvent. Solvent vapor is recovered overhead in stream 38, condensed in cooler 40 and collected in water-solvent separator 42 for recycle to the solvent extraction unit 16.

The asphaltenes in stream 20 are heated and fed to stripper 44 with steam introduced via streams 46 and 48 and additional heating via reboiler 50 to obtain solvent-lean asphaltenes stream 52 that is fed to a gasifier as discussed in more detail below.

Solvent deasphalting processes typically use solvents selected from low molecular weight aliphatic hydrocarbons such as propane, butanes, pentanes, and mixtures thereof. The solvent selection and operating conditions determine the yields, the heat duties, and the required temperatures of the heat services. In particular, butane and especially pentane solvents offer desirable performance by attaining high recovery of DAO and a minimal asphaltene product fraction that can have a sufficiently low viscosity for gasification, thus minimizing the size of the IGCC equipment needed. The present invention is also particularly applicable to ROSE solvent systems comprising mainly pentane because of the higher heat service temperatures.

The major heat-driven steps in ROSE include DAO phase separation in separator 22, DAO stripping in stripper 28, and asphaltenes stripping in stripper 44. Supercritical solvent recovery, as practiced in the ROSE process, reduces heat loads compared with solvent recovery conducted below the critical temperature of the solvent. Using isopentane as solvent, roughly 55 to 75 percent of ROSE process heat duties are met by cross-exchange between streams within the ROSE system. The balance of the process heat duties requires heat input, which requires high-level temperatures, e.g. from 170° C. to 370° C.

The DAO separator feed heater 54 requires the largest quantity of high-level heat duty, but also requires a relatively lower temperature than the other external heat services, including the DAO stripper reboiler 34, asphaltene stripper preheater 56, asphaltene stripper reboiler 50, and optionally superheating of the stripping steam 46 and 48. The isopentane ROSE process also includes two heat rejection process units at coolers 58 and 60 that can conveniently be air coolers or could alternatively be boilers to generate low-pressure steam representing roughly 35 to 50 percent of the total high-level heat input requirements.

Using normal butane as solvent in a ROSE process according to FIG. 1, high-level heat input occurs from about 160° C. up to about 255° C. Approximately 45 to 65 percent of the heat input is required at 240° C. to 255° C.; and about 35 to 55 percent of the heat input is required at 160° C. to 180° C. The upper and lower-range duties can be met using steam, typically at nominal steam pressures of 4.1 MPa (600 psig) and 1.0 MPa (150 psig), respectively. The steam mass flow rates at the two pressures are typically roughly equal. Roughly 40 to 60 percent of process heat requirements are provided by cross-exchange, and the balance requires heat input.

Figure 2:
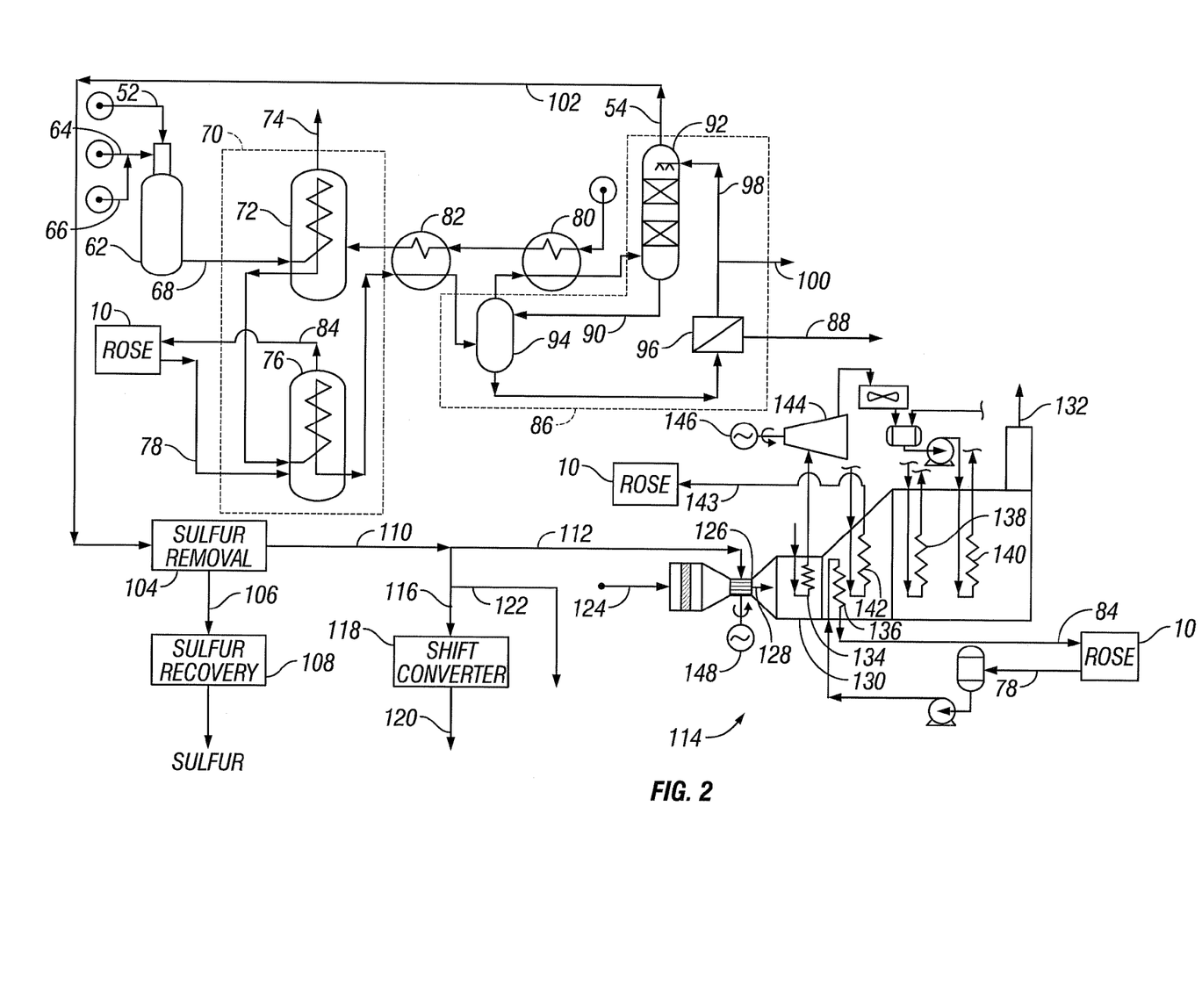
FIG. 2 is a process schematic of an IGCC system for integration with a ROSE unit according to an embodiment of the present invention.

The IGCC subsystems are seen in FIG. 2. The gasifier 62 uses oxygen 64, which can be mixed with steam 66, to partially oxidize the asphaltenes 52, generating an effluent high-temperature raw fuel gas stream 68 in a well-known manner. The raw fuel gas 68 is partially cooled in a high temperature convection section 70. The convection section 70 can include dual heat recovery coils in waste heat boiler (WHB) 72 to generate steam 74, and in hot oil heater 76 to reheat heat transfer fluid 78. Boiler feedwater (BFW) can flow through preheaters 80 and 82, then to the WHB 72. The fuel gas 68 gives up additional heat in the BFW preheaters 80, 82. The hot transfer fluid 84 from the heater 76 provides high-level heat to the ROSE unit 10. A portion of the WHB steam 74 can also be used to provide heat to the ROSE unit 10.

After cooling, the fuel gas 68 can be cleaned to remove soot, ash, and sulfur. Ash and soot in the gasifier effluent 68 can be removed in waterwash/filtration unit 86, and recovered as filter cake 88. Bottoms 90 from a scrubber 92 can serve as feed to a soot quench drum 94 and are recirculated through filter 96 and line 98 to the scrubber 92. A slipstream 100 can be sent to sour water stripping (not shown).

After particulate removal the fuel gas 102 passes through a conventional absorber/stripper unit 104 or other sulfur removal equipment known in the art to remove sulfur compound stream 106, which can be converted to elemental sulfur in conventional sulfur recovery unit 108, or converted to sulfuric acid for export as such. A cleaned fuel gas stream 110 leaving the sulfur removal unit 104 is optionally split, sending a first portion 112 to combined cycle unit 114. A second portion of the fuel gas is optionally delivered as a syngas feed 116 to shift converter 118 to generate hydrogen-rich stream 120, and/or as synthesis gas 122 to other downstream processes.

In the combined cycle process 114, clean fuel gas 112 is burned with air 124 in a gas turbine 126. Exhaust 128 from the gas turbine 126 passes through a heat recovery steam generator (HRSG) 130 and exits via discharge 132. The HRSG 130 can include steam superheating coil 134, heat transfer oil heating coil 136, steam generation coil 138, and BFW heating coil 140. In addition to or as one alternative to the heater 76 and/or heating coil 136, the HRSG 114 can include a steam heating coil 142 for supplying high-pressure steam 143 to ROSE unit 10. The high pressure steam coils 134, 142 and transfer oil heaters 76, 136 correspond to heat recovery configurations in FIGS. 3-7 discussed below for high level heat input to ROSE unit 10. Hot oil 84 can be pumped from the HRSG oil heater 136 to ROSE unit 10, and after providing high-level heat requirements of the ROSE unit 10, returned via line 78. The HRSG steam typically drives steam turbine 144, which is coupled to an electric generator 146. The gas turbine 126 also drives an electric generator 148.

The asphaltene feed 52 usually enters the gasifier 62 at a maximum temperature of about 300° C. (570° F.) to avoid coke formation in the gasifier feed lines and burner. The feed temperature also needs to be such that the asphaltenes have a suitable viscosity at the burner, desirably less than 300 cSt. If the viscosity of the asphaltenes is too high, adjusting the extraction temperature or solvent composition to reduce DAO yield in the ROSE unit 10 can reduce the viscosity of the asphaltenes. Adding solvent or another low-viscosity hydrocarbon diluent to the asphaltenes could be another way to reduce asphaltenes viscosity. However, asphaltene streams from typical atmospheric or vacuum tower bottoms will usually have a sufficiently low viscosity for gasification with maximum DAO recovery with butane or, desirably, pentane.

In the IGCC, the heat transfer fluid 84 is desirably heated to a temperature of from 340° C. to 400° C., more desirably from 360° C. to 380° C. The transfer fluid 84 can provide from 30 to 100 percent of the high-level heat requirements for the ROSE unit 10. FIGS. 3-7 show resid processing configurations that use the transfer fluid 84, steam from the WHB 72 and HRSG coil 142, and combinations thereof.

The gasifier 62 can be of a quenching design (not shown), or desirably of the non-quenching design illustrated in FIG. 2. Selection of quenching or non-quenching gasification determines steam pressures and temperatures in the WHB 72 and heater 76. The non-quenching gasifier 62 can attain design steam pressures in excess of 10 MPa. A quench type gasifier can be expected to have an upper steam pressure limit from 0.6 to 2 MPa.

In combined cycle systems, gas turbine exhaust temperatures typically range from about 370° C. to 600° C., reflecting the state of the art of gas turbines. Exemplary data discussed below use a cooling curve shown in FIG. 12 for the gas turbine exhaust 128 to illustrate a heat recovery configuration for heat transfer fluid 78, 84 at high level temperatures.

Figure 3:
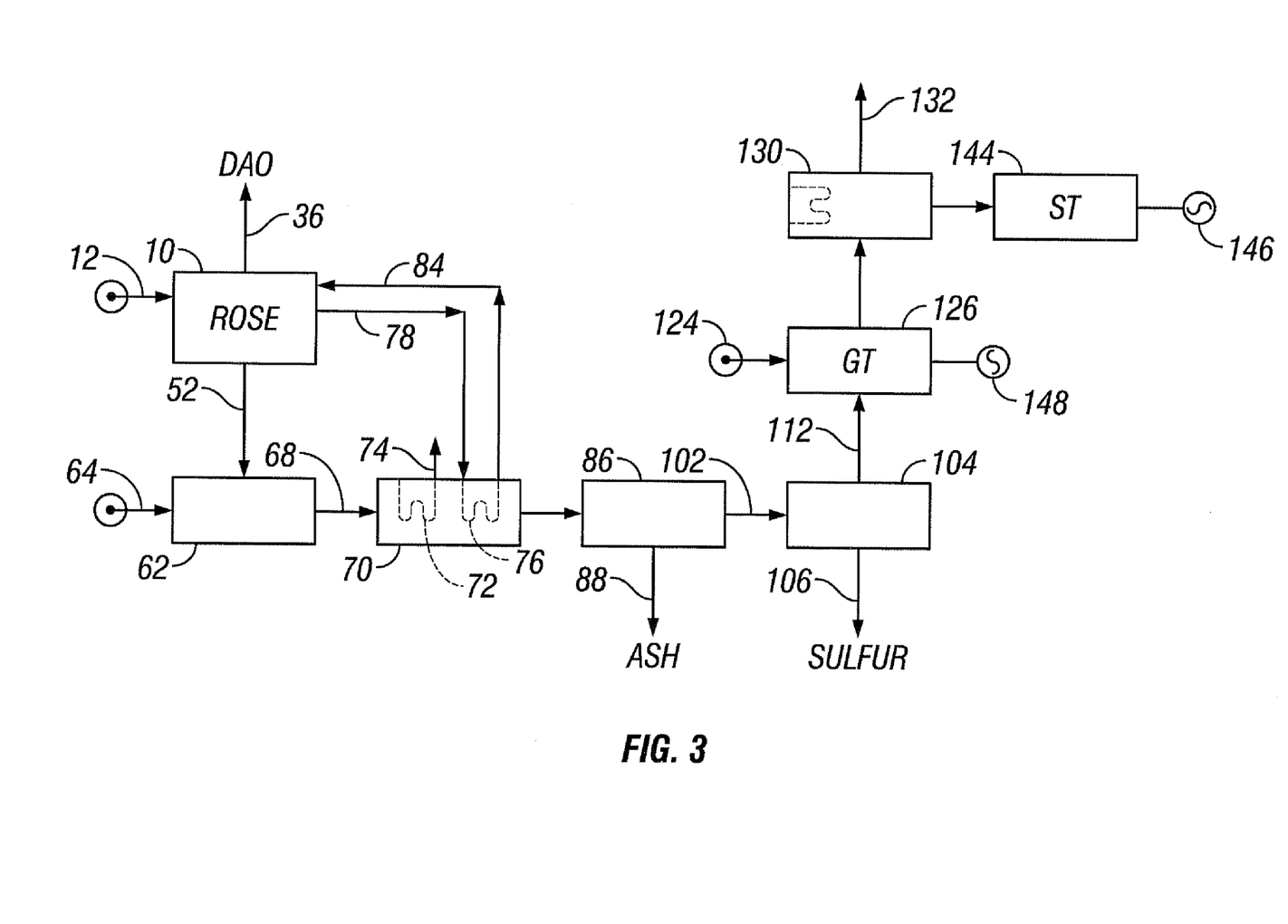
FIG. 3 is a simplified block flow diagram of integrated ROSE-IGCC according to an embodiment of the present invention, showing recovery of high-level ROSE heat requirements from the gasification unit using a heat transfer fluid.

FIG. 3 depicts an embodiment of the ROSE-IGCC integration of the present invention for processing a "bottom-of-the-barrel" residual oil (resid) stream 12 in a refinery. The resid can be atmospheric tower bottoms, vacuum tower bottoms, or a like refinery stream containing asphaltenes and oil that can be recovered in commercially viable proportions by solvent extraction. Sulfur, metals, and ash are the primary waste-forming constituents of resid. Resid processing begins with the ROSE unit 10 to recover DAO 36 and asphaltenes stream 52, as discussed above in reference to FIG. 1.

The ROSE unit 10 uses high-level heat provided by heat transfer fluid 84 to recover the solvent from the DAO 36 and asphaltenes 52, and returns heat transfer fluid 78 at a reduced temperature to the heat recovery section 70 for reheating in the closed-loop oil heater 76. The term "high-level heat" in the specification and claims refers to heat transfer with the heating medium at a temperature above 165° C. and desirably above 225° C. in the case of a C5 solvent. The high level heat can be provided by high pressure steam (above 0.96 MPa (140 psig)), or a heat transfer fluid 84 such as Dowtherm® oil, for example, or a combination thereof.

The gasification 62 partially oxidizes the asphaltene stream 52 with oxygen 64, producing an effluent gas stream 68 which may carry entrained ash and soot, as described above in reference to FIG. 2. The gas 68 is partially cooled in heat recovery section 70, producing steam 74 and reheating the heat transfer fluid from line 78 for return to the ROSE unit 10 via line 84. The cooled gas then passes through waterwash/filtration unit 86 to remove ash 88, then sulfur removal unit 104, to obtain cleaned gas 112 fed to the gas turbine 126 with air 124 to produce electrical power 148. The gas turbine exhaust is then used to heat steam in HRSG 130 and discharged via line 132. Steam from the HRSG 130 is supplied to steam turbine 144 to generate additional power 146.

Figure 4:
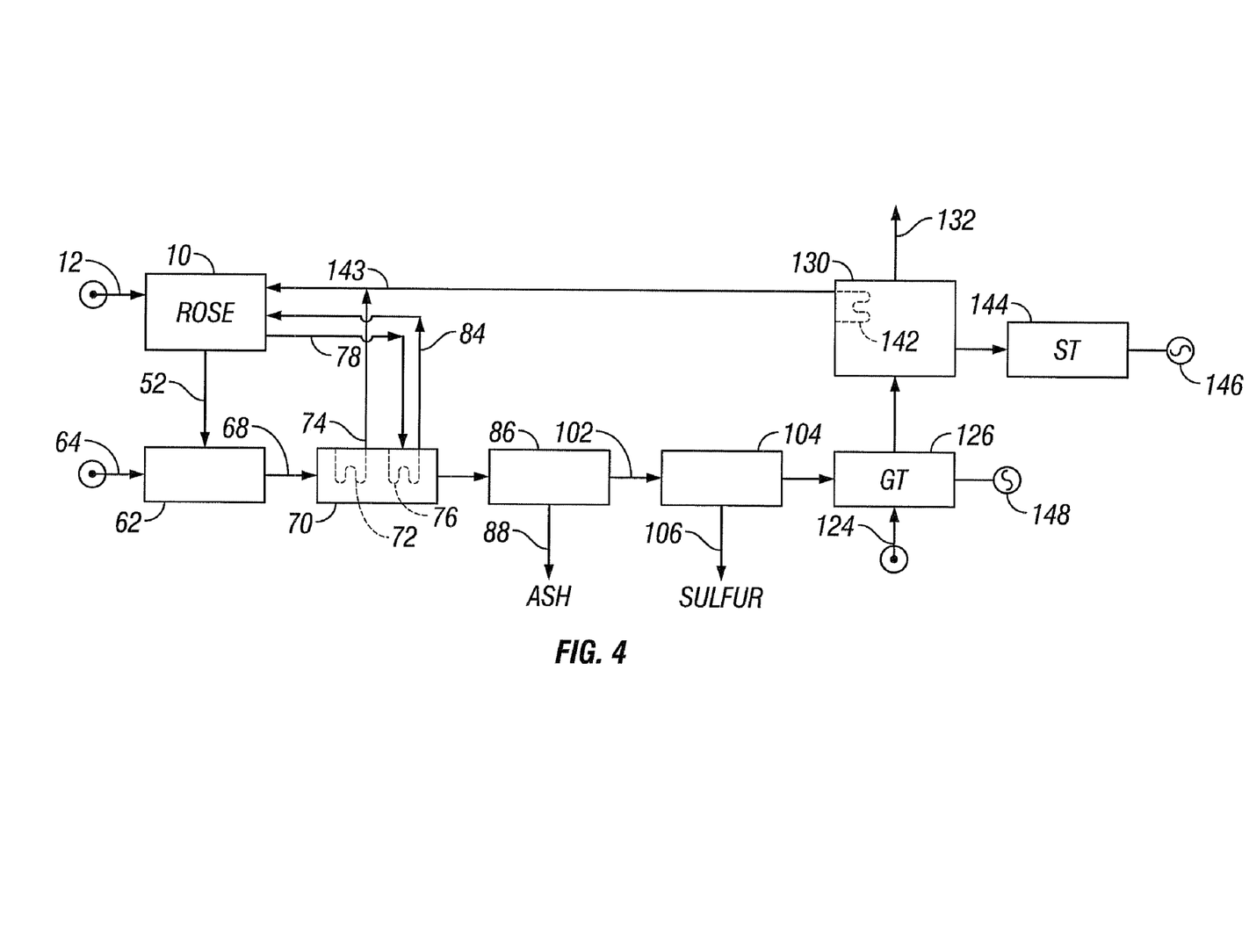
FIG. 4 is a simplified block flow diagram of another embodiment of the invention with recovery of high-level heat using a heat transfer fluid heated in the gasification section, plus high pressure steam from gasification, combined cycle, or a combination thereof.
Figure 10:
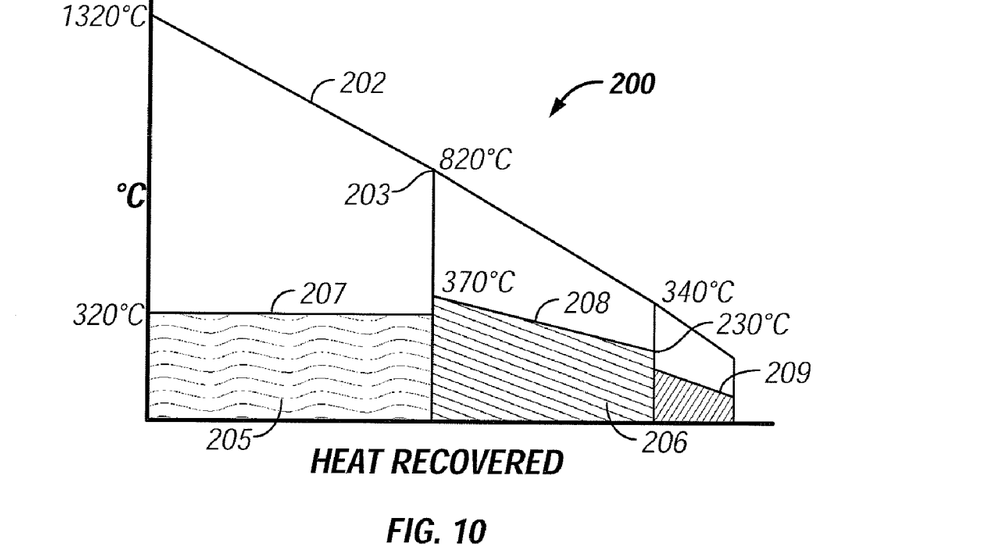
FIG. 10 is a representative cooling curve for the hot gasifier effluent in the embodiment of FIG. 3.
Figure 11:
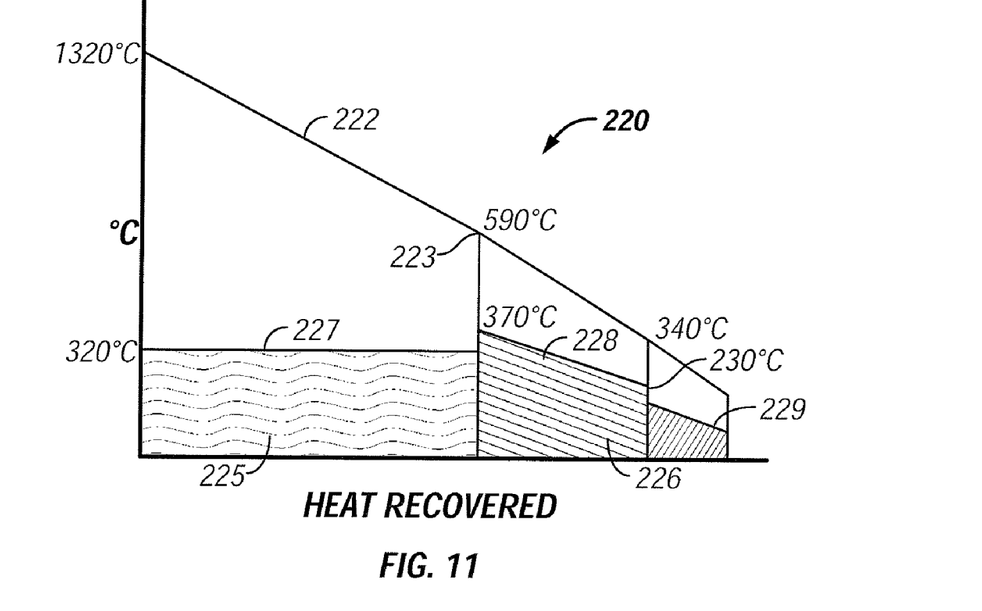
FIG. 11 is a representative cooling curve for the hot gasifier effluent in the embodiment of FIG. 4.

In FIG. 4 the high level heat supply needed for solvent recovery in the ROSE unit 10 is provided partly by hot oil 84 from gasification heat recovery section 70, and partly by high-pressure steam 74, 143. The steam 74, 143 to ROSE unit 10 can come from the gasification WHB 72 or the HRSG steam coil 142, using either source alone or in combination. In this configuration, steam 143 can be provided for the DAO separator feed heater 54 (see FIG. 1). The hot oil 84 is provided for services 34, 50, 56 and optionally for superheating of the stripping steam 30, 46. This design reduces requirements for the hot oil 84, and allows a temperature split in the heat recovery section 70 at a lower temperature level, as illustrated by FIGS. 10 and 11.

Figure 5:
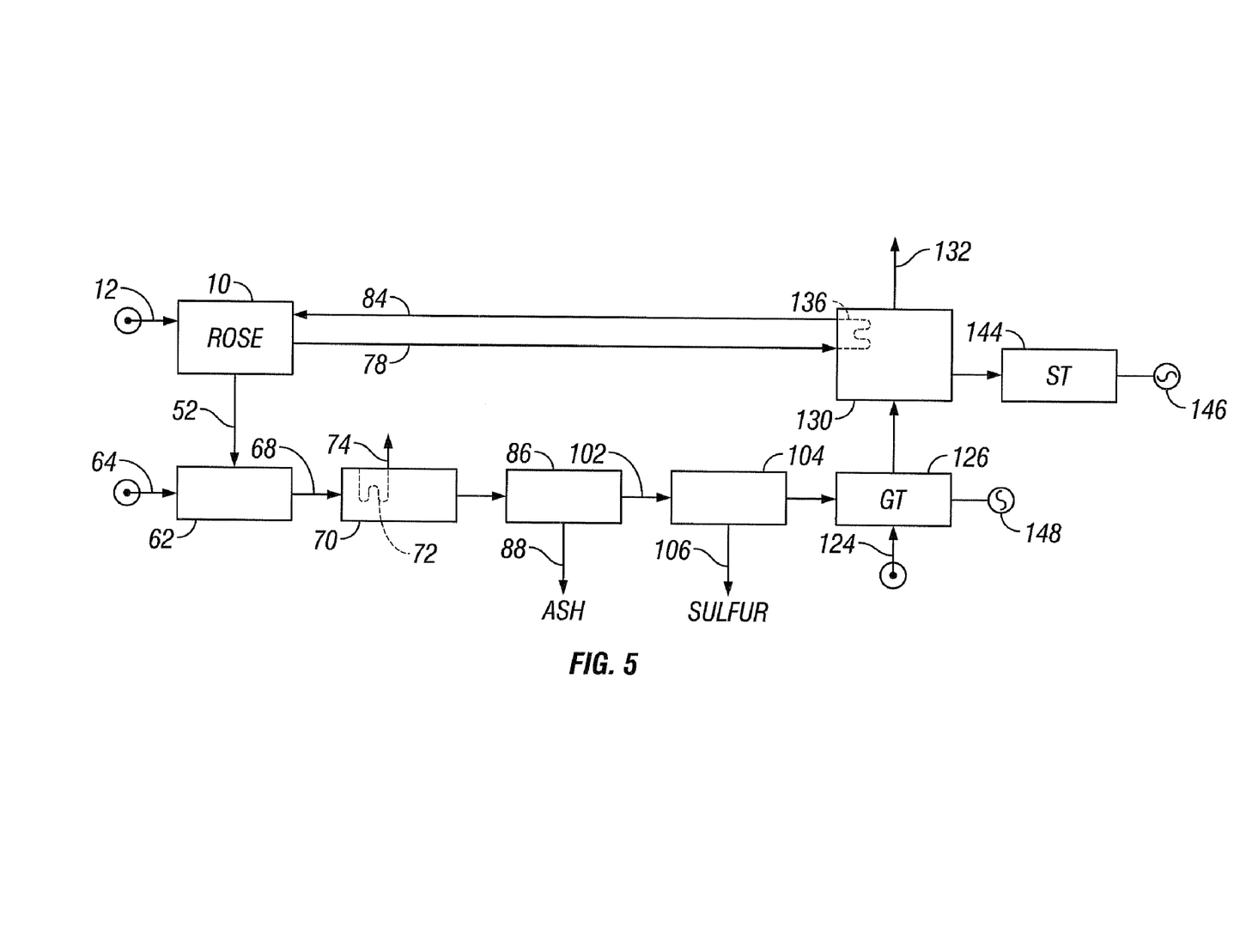
FIG. 5 is a simplified block flow diagram of another embodiment of the invention with recovery of high-level heat from IGCC using a heat transfer fluid.

In FIG. 5, transfer fluid 84 from the dedicated hot oil heating coil 136 in the HRSG 130 provides full high level heat input to the ROSE unit 10. Hot oil 84 is pumped to ROSE unit 10 and returned via line 78 to HRSG 130 for reheating.

Figure 6:
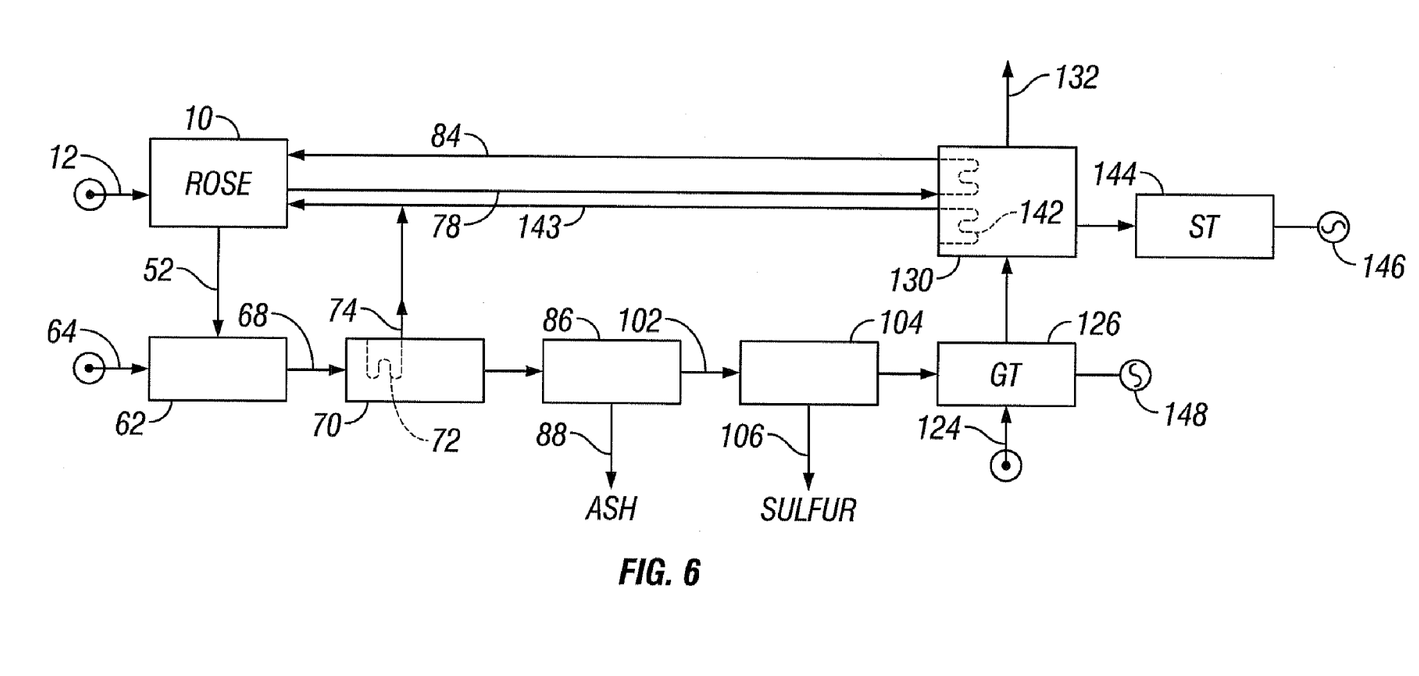
FIG. 6 is a simplified block flow diagram of another embodiment of the invention showing integrated high level heat recovery using a transfer fluid heated in the combined cycle, plus high pressure steam from the gasification section, combined cycle, or a combination thereof.

In FIG. 6, high-level heat duties for the ROSE unit 10 are split between hot oil 84 and high-pressure steam 74, 143. In this configuration, high-pressure steam 74, 143 is provided for the DAO separator feed heater 54 (see FIG. 1). The steam 143 is provided from the HRSG 130, and steam 74 from the gasification WHB 72, or steam is provided from a suitable combination of the two sources. This design reduces the requirements for hot oil 84 as compared to the scheme shown in FIG. 5.

Figure 7:
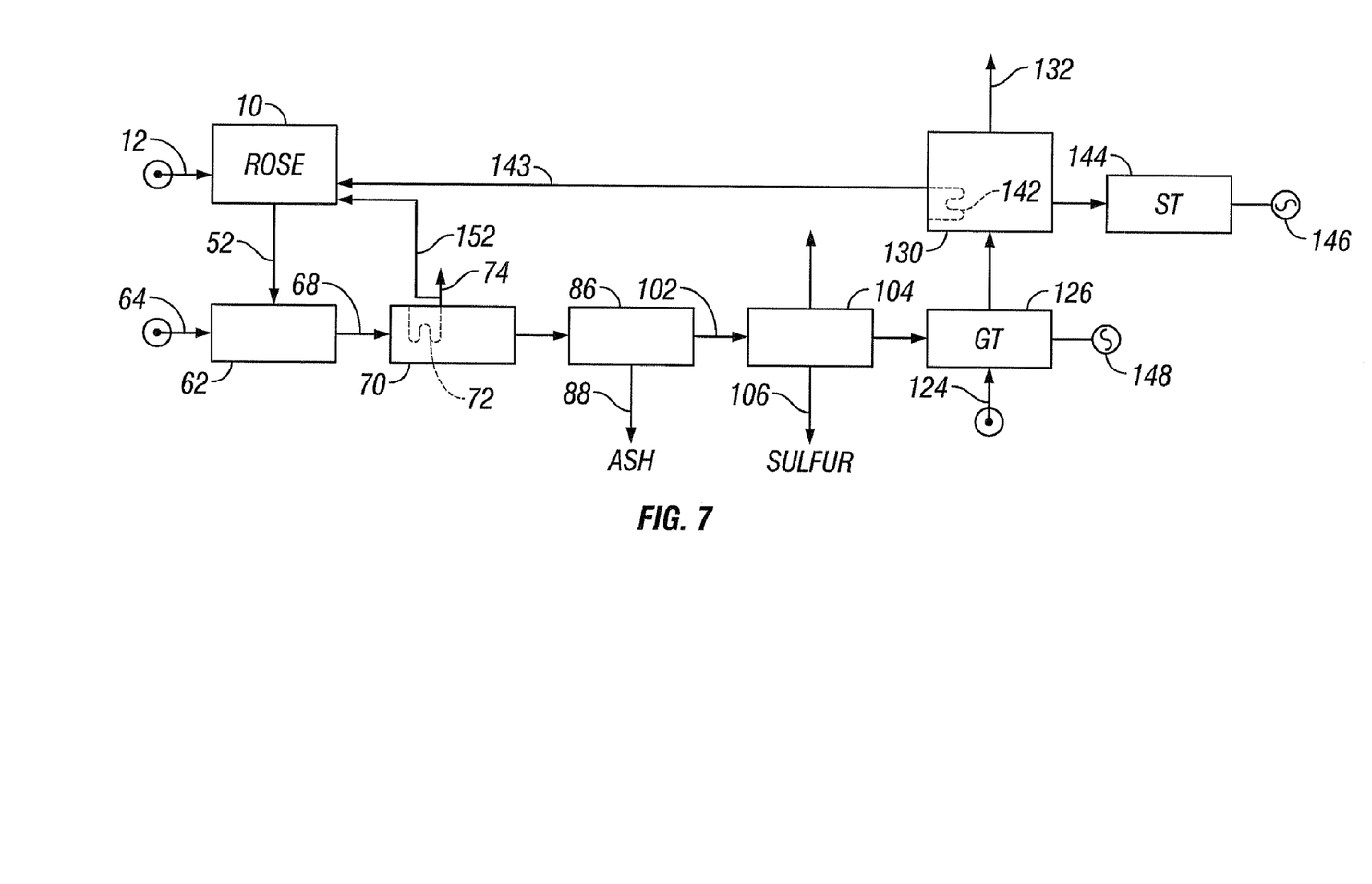
FIG. 7 is a simplified block flow diagram of another embodiment of the invention using butane solvent in the ROSE unit, and integrated to provide all high-level heat duties using medium pressure steam from the gasification and high-pressure steam from the combined-cycle.

FIG. 7 represents a case for butane solvent in the ROSE process. Higher pressure steam 143 is provided to ROSE unit 10 from the HRSG 130, and medium-pressure steam 152 is provided from the WHB 72 downstream of the gasifier 62.

Figure 8:
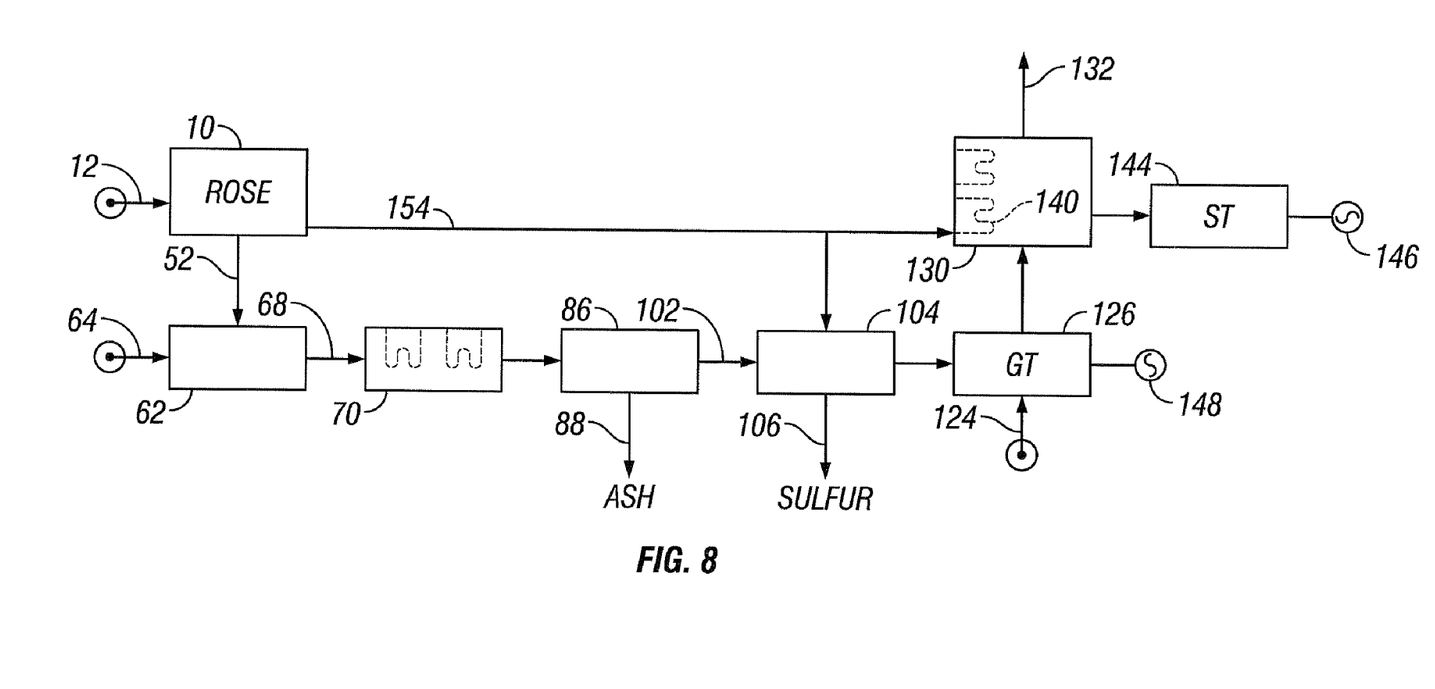
FIG. 8 is a simplified block flow diagram of another embodiment of the invention showing export of low-pressure steam from the ROSE unit for use in the gas cleaning and IGCC systems.

FIG. 8 shows an integration that can complement the schemes in FIGS. 3-7, depicting a distribution of low-grade heat rejected from ROSE unit 10 by generating steam 154 at coolers 40, 60 (see FIG. 1) operated as boilers, for example, at approximately 0.35 MPa. Low pressure steam 154 can be used in at least one reboiler in sulfur removal unit 104 and in the HRSG 130 for BFW heating and deaeration.

The invention is illustrated by way of the following exemplary simulation data.

Typical High-Level Heat Distributions—Table 1 lists typical cases corresponding to the embodiments of the invention in FIGS. 3-7. Table 1 summarizes high level heat distributions provided by steam and hot oil, giving percentages of high level heat duties derived from respective sources, and percentages of heat available from those sources that are consumed to satisfy the high level loads. Typical resid treatment capacities are 4800 to 6400 cubic meters per stream day (m3/sd) (30,000 to 40,000 (42-gallon) barrels per stream day (BPSD)) resid feed, yielding 50 to 75 volume percent of DAO.

TABLE 1

High-Level Heat Transfer Loads in Integrated ROSE-IGCC.

| | ROSE Heat Input From IGCC (Net % High Level Energy Demand, Excludes internal exchange duties) | | | IGCC Heat Output to ROSE % of Recoverable Exhaust Energy from Gasifier and/or HRSG HP Steam Equivalent From: | |
|---|---|---|---|---|---|
| | Hot Oil From: | | | Gasifier (% of | |
| Case | Gasifier | Turbine Exhaust | Steam From: HRSG/WHB | gasifier waste heat) | Turbine Exhaust |
| 1 (FIG. 3) | 100 | | | 42 | |
| 2 (FIG. 4) | 44 | | 56 | 18 | 8 |
| 3 (FIG. 5) | | 100 | | | 15 |
| 4 (FIG. 6) | | 44 | 56 | | 8 |
| 5 (FIG. 7) | | | 100 | | 4 |

Figure 9:
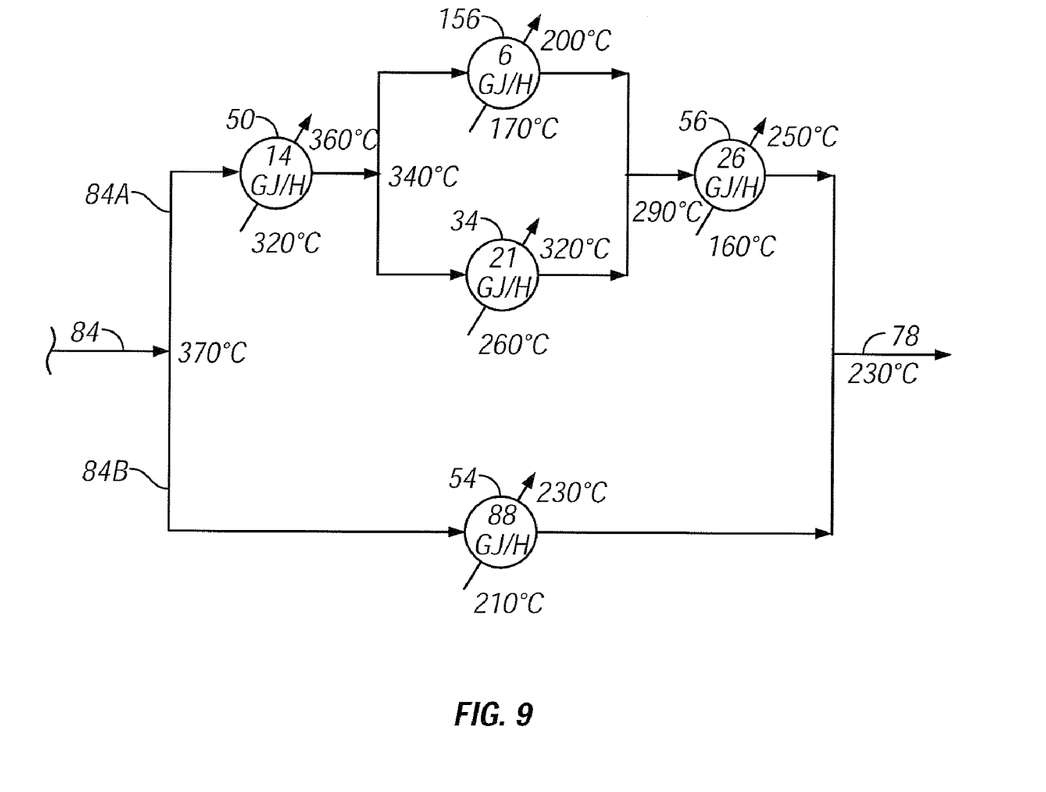
FIG. 9 is a schematic of a hot oil system that can be used in the ROSE unit of FIG. 3 showing selected temperatures and duties of the hot oil according to an embodiment of the invention.

Typical Hot Oil Heat Loads—FIG. 9 illustrates an embodiment of heat load distributions for a heat transfer fluid system to meet high level heat demands in the ROSE unit 10 in FIGS. 3 and 5, corresponding to Cases 1 and 3 in Table 1. The hot oil stream 84 is split to provide roughly 44 percent of its available sensible heat to loop 84A, and a balance of about 56 percent of the sensible heat to loop 84B. The high-level heat inputs in loop 84A include, in order of decreasing temperature levels, the asphaltene stripper reboiler 50, the DAO stripper reboiler 34, a superheater 156 for stripping steam 30, 32, 46 and 48, and the asphaltene stripper feed heater 56. Loop 84B provides heat duty to the DAO separator feed heater 54.

Alternatively, as seen in FIGS. 4 and 6, the hot oil 84 is limited to providing that portion of the high level heat load served by loop 84A. This amounts to about 44 percent of the high-level heat duty for the ROSE unit 10. Now high-pressure steam 143 from the gasification WHB 72 or the HRSG 130, or a combination thereof, provides about 56 percent of the high-level heat duty.

Typical Gasifier Effluent Cooling Curves—FIGS. 10-11 are cooling curves for total heat recovery from the gasifier effluent 68, showing a split in heat duties allocated to the WHB 72, the oil heater 76, and low level heat recovery. The curves in FIGS. 10-11 depict temperature profiles for cooling the raw gas 68 (lines 202, 222), versus the generation of high-pressure steam 74 (lines 207, 227), heating of transfer fluid 84 (lines 208, 228), and preheating BFW (lines 209, 229).

FIG. 10 profiles heat recovery corresponding to an isopentane ROSE/IGCC configuration of FIG. 3, for which heat transfer fluid 84 is used to provide 100 percent of the high level ROSE unit heat duties. The gas cooling curve 202 in FIG. 10 shows a break point 203 at about 820° C. between the heat absorbed by steam generation 205 in the WHB 72 and heat 208 absorbed by the oil heater 76. Lines 207, 208 plot the heat recovery for heating the steam and heat transfer fluid, respectively.

FIG. 11 shows an analogous cooling curve for a case in which transfer fluid 84 serves only the high level ROSE heat loads of loop 84A of FIG. 9. This applies to the ROSE/IGCC configuration of FIG. 4 with isopentane solvent. High-pressure steam from the WHB 72 or the HRSG 130, or a combination thereof, provide heat to the feed heater 54 of the DAO separator 22 in loop 84B of FIG. 9. This allocation of heat loads lowers the break point temperature 223 in the raw gas cooling curve 222 to about 590° C. at the split between WHB 72 and oil heater 76. The heat load for steam generation 225 has increased relative to the heat load for hot oil 226.

Figure 12:
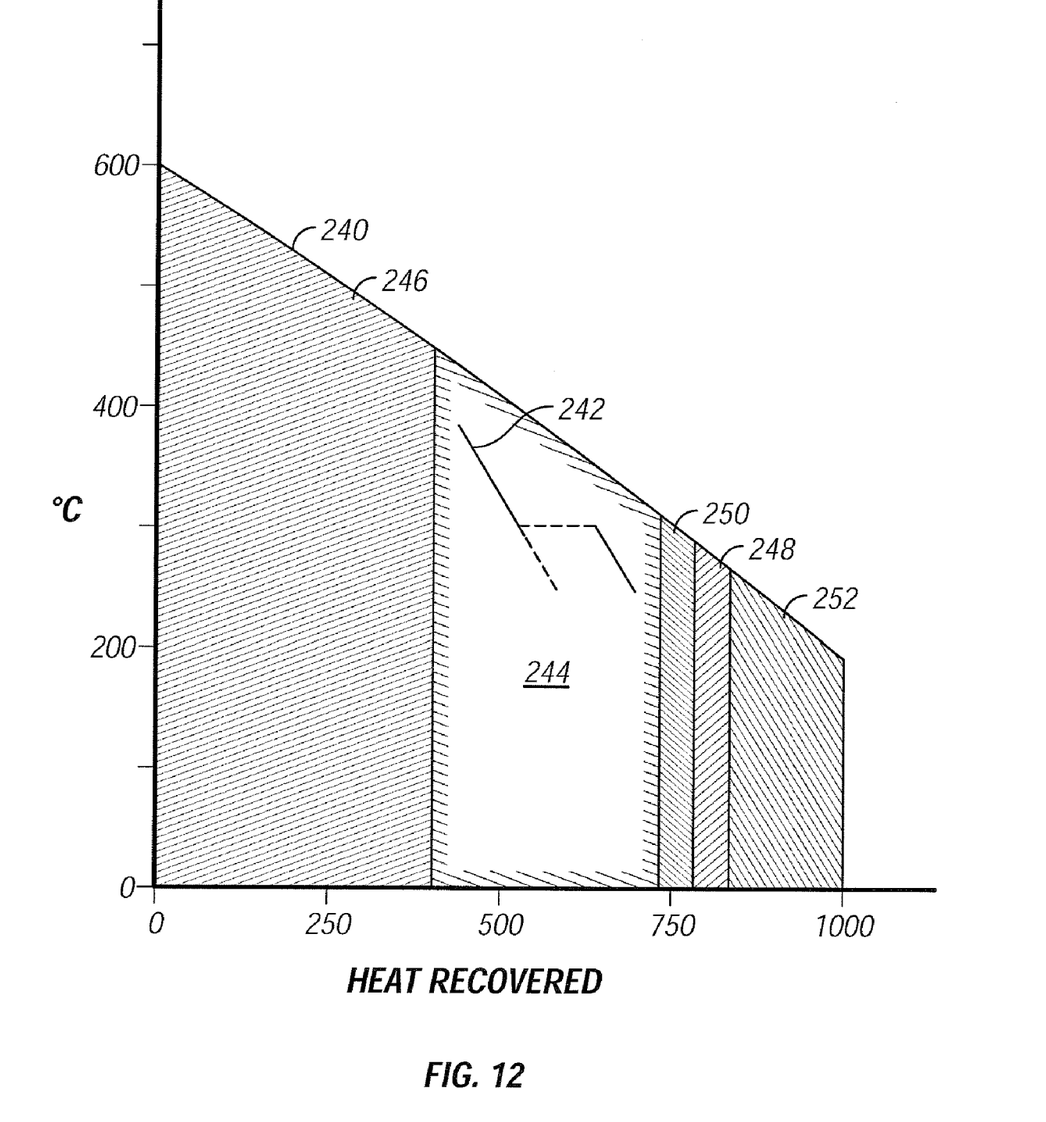
FIG. 12 is a representative cooling curve for hot gas turbine exhaust in the combined cycle according to the embodiment of FIG. 5.

Typical Gas Turbine Exhaust Cooling Curve—FIG. 12 shows a cooling curve 240 for gas turbine exhaust gas with reference to high level heat recovery per FIG. 5. This shows a case using a dedicated oil heater 136 to recover exhaust heat in the combined-cycle process 114. The placement of a heating curve 242 for transfer fluid 84 illustrates a temperature profile for recovering the high-level heat duty for input to ROSE unit 10. The transfer fluid heat recovery is taken in a temperature range otherwise allocated to steam generation. As a result, less steam is generated in the HRSG 130, and correspondingly lower heat duties are used for high-pressure steam superheating 246, for high-pressure steam generator 244, for low- and medium-pressure steam generation 248, 250, and for BFW preheating 252. Altogether, these reductions in steam heating loads result in reduced steam production in the combined-cycle process.

The invention is described above with reference to non-limiting examples provided for illustrative purposes only. Various modifications and changes will become apparent to the skilled artisan in view thereof. In particular, it will be recognized that process design and economic drivers will evolve, and a need will remain to achieve new balances of cost and performance, deriving different specific results than described herein. It is intended that all such changes, modifications, and applications within the scope and spirit of the appended claims shall be embraced thereby.

The invention claimed is:

1. Integrated process for residual oil supercritical extraction (ROSE), asphaltenes gasification, gas cleaning and combined cycle power generation or gas processing, comprising:
   processing the residual oil with solvent in a ROSE unit, having high level heat requirements to recover an asphaltene stream and a deasphalted oil stream, wherein the high level heat recovery requirements are at temperatures of at least 155 C.
   gasifying the asphaltene stream to form a gas stream;
   cleaning the gas stream to remove ash, soot, sulfur or a combination thereof;
   supplying the cleaned gas stream to (1) a combined cycle system for generation of power, steam or a combination thereof, (2) a gas processing system to produce hydrogen, synthesis gas, fuel gas, or a combination thereof, or (3) a combination thereof;
   recovering high level heat from the gas stream, from the combined cycle system, or from a combination thereof, to supply the high level beat requirements of the ROSE unit.

2. The process of claim 1 wherein at least a portion of the high level heat recovery requirements use steam at a pressure of at least 0.7 MPa.

3. The process of claim 1 wherein at least a portion of the high-level heat recovery requirements use a heat transfer fluid at a pressure below 1 MPa.

4. The process of claim 1 wherein the high-level heat recovery requirements use (1) steam at a pressure of at least 0.7 MPa, (2) a heat transfer fluid at a pressure below 1 MPa, or (3) a combination thereof.

5. The process of claim 4 wherein a majority of solvent used in the ROSE unit comprises pentane.

6. The process of wherein high level heat is recovered from the gas stream from the gasification using a high-pressure steam boiler and a heat transfer fluid heater, and wherein the heat transfer fluid from the heater is supplied to provide substantially all of the high level heat requirements of the ROSE unit and recirculated to the heater.

7. The process of claim 5 wherein:
   high level beat is recovered from the gas stream from the gasification using a first high-pressure steam boiler and a heat transfer fluid heater;
   high level heat is recovered from gas turbine exhaust in the combined-cycle system using a second high-pressure steam boiler;
   the heat transfer fluid from the heater is supplied to provide from 30 to 70 percent of the high level heat requirements of the ROSE unit and recirculated to the heater; and
   steam from the first boiler, the second boiler, or a combination thereof is supplied to provide from 30 to 70 percent of the high level heat requirements of the ROSE unit.

8. The process of claim 5 wherein high level heat is recovered from gas turbine exhaust in the combined-cycle system using a high-pressure steam boiler and a heat transfer fluid heater, and wherein the heat transfer fluid from the heater is supplied to provide the high level heat requirements of the ROSE unit and recirculated to the heater.

9. The process of claim 5 wherein:
   high level heat is recovered from the gas stream from the gasification using a first high-pressure steam boiler;
   high level heat is recovered from gas turbine exhaust in the combined cycle system using a second high-pressure steam boiler and a heat transfer fluid heater;
   the heat transfer fluid from the heater is supplied to provide from 30 to 70 percent of the
   high level heat requirements of the ROSE unit and recirculated to the heater, and
   steam from the first boiler, the second boiler, or a combination thereof is supplied to satisfy from 30 to 70 percent of the high level heat input to the ROSE unit.

10. The process of claim 5 wherein low-pressure steam from the ROSE unit is supplied to heat boiler feed water for the high level heat recovery, to heat fluid in a reboiler for the fried gas cleaning, or a combination thereof.

11. The process of claim 4 wherein a majority of solvent used in the ROSE unit comprises butane.

12. The process of claim 11 wherein:
   heat is recovered from gas turbine exhaust in the combined-cycle system using a high-pressure steam boiler and from the gas stream from the gasification using a medium-pressure steam boiler;
   steam from the high-pressure boiler is supplied to provide from 30 to 70 percent of the high level heat requirements of the ROSE unit; and
   steam from the medium-pressure boiler is supplied to provide from 30 to 70 percent of the high level heat requirements of the ROSE unit.

13. A process for gas processing, comprising:
   processing a residual oil with solvent in a supercritical extraction unit having high level heat requirements to recover an asphaltene stream and a deasphalted oil stream;
   gasifying the asphaltene stream to form a gas stream;
   recovering heat in excess of 155° C. from the gas stream;
   returning the recovered heat to the supereritical extraction unit;
   cleaning the gas stream to remove ash, soot, sulfur or a combination thereon; and supplying at least a portion of the cleaned gas stream to a combined cycle system for generation of power, steam or a combination thereof.

14. The process of claim 13, wherein the residual oil comprises atmospheric tower bottoms, vacuum tower bottoms, or a combination thereof.

15. The process of claim 13, wherein gasifying the asphaltene stream to form a gas stream comprises partially oxidizing the asphaltene stream in the presence of oxygen.

16. The process of claim 13, wherein the solvent comprises butane or pentane.

17. A process for gas processing, comprising:
processing a residual oil with solvent in a supercritical extraction unit having high level heat requirements to recover an asphaltene stream and a deasphalted oil stream;
gasifying the asphaltene stream to form a gas steam;
recovering heat in excess of 155° C. from the gas stream;
returning the recovered heat to the supercritical extraction unit;
cleaning the gas stream to remove ash, soot, sulfur or a combination thereof;
supplying a first portion of the cleaned gas steam to a gas processing system to produce hydrogen; and
supplying a second portion of the cleaned gas stream to a combined cycle system for generation of power, steam or a combination thereof.

18. The process of claim 17, wherein gasifying the asphaltene stream to form a gas stream comprises partially oxidizing the asphaltene stream in the presence of oxygen.

19. The process of claim 17, wherein the solvent comprises butane or pentane.

* * * * *